Jan. 18, 1949.　　　G. T. BAKER　　　2,459,613
VALVE MECHANISM FOR A HYDRAULIC POWER UNIT
Filed Feb. 26, 1947　　　　　　　　　　2 Sheets-Sheet 1
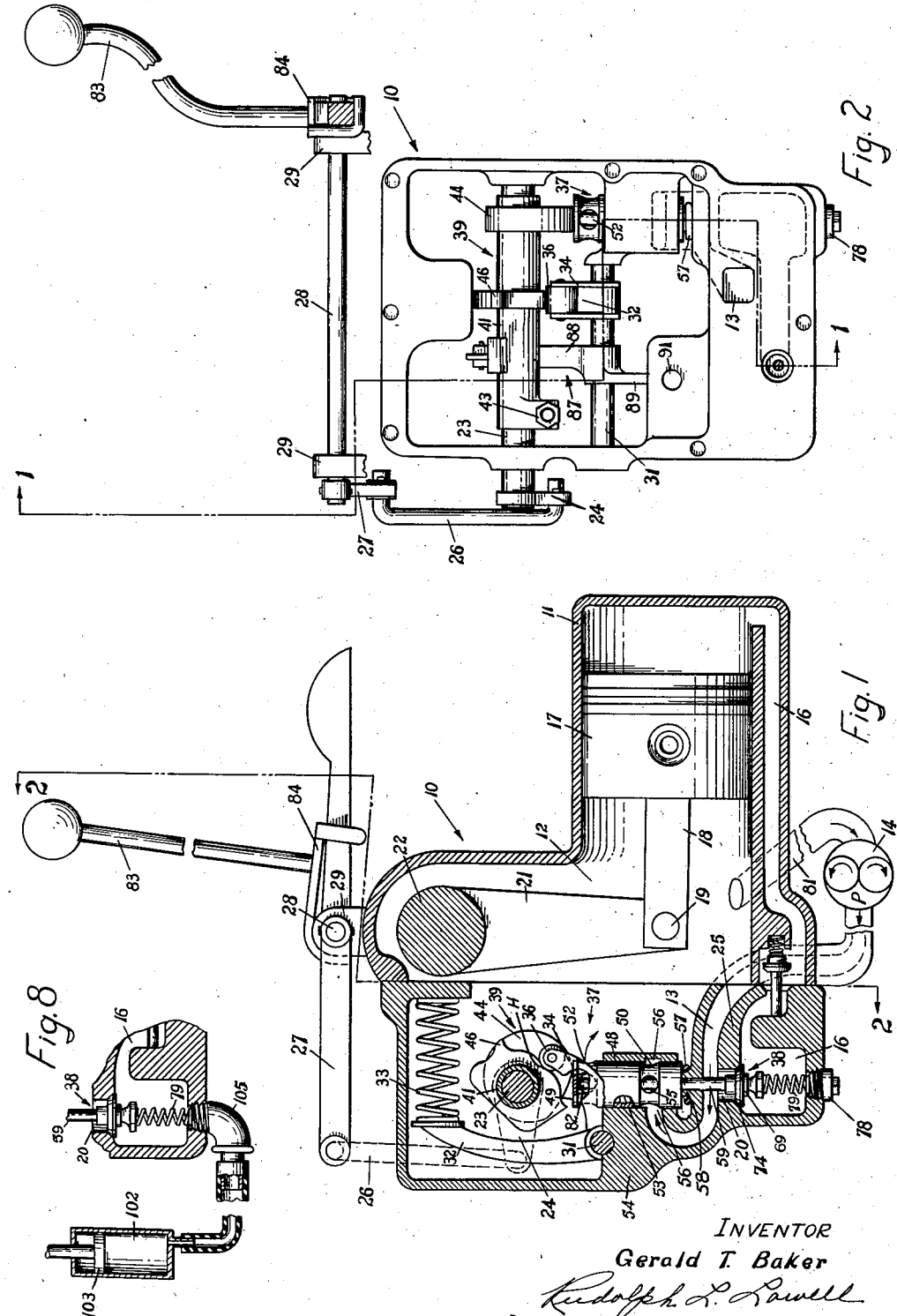
INVENTOR
Gerald T. Baker
By　　　　　　　　　ATTY.

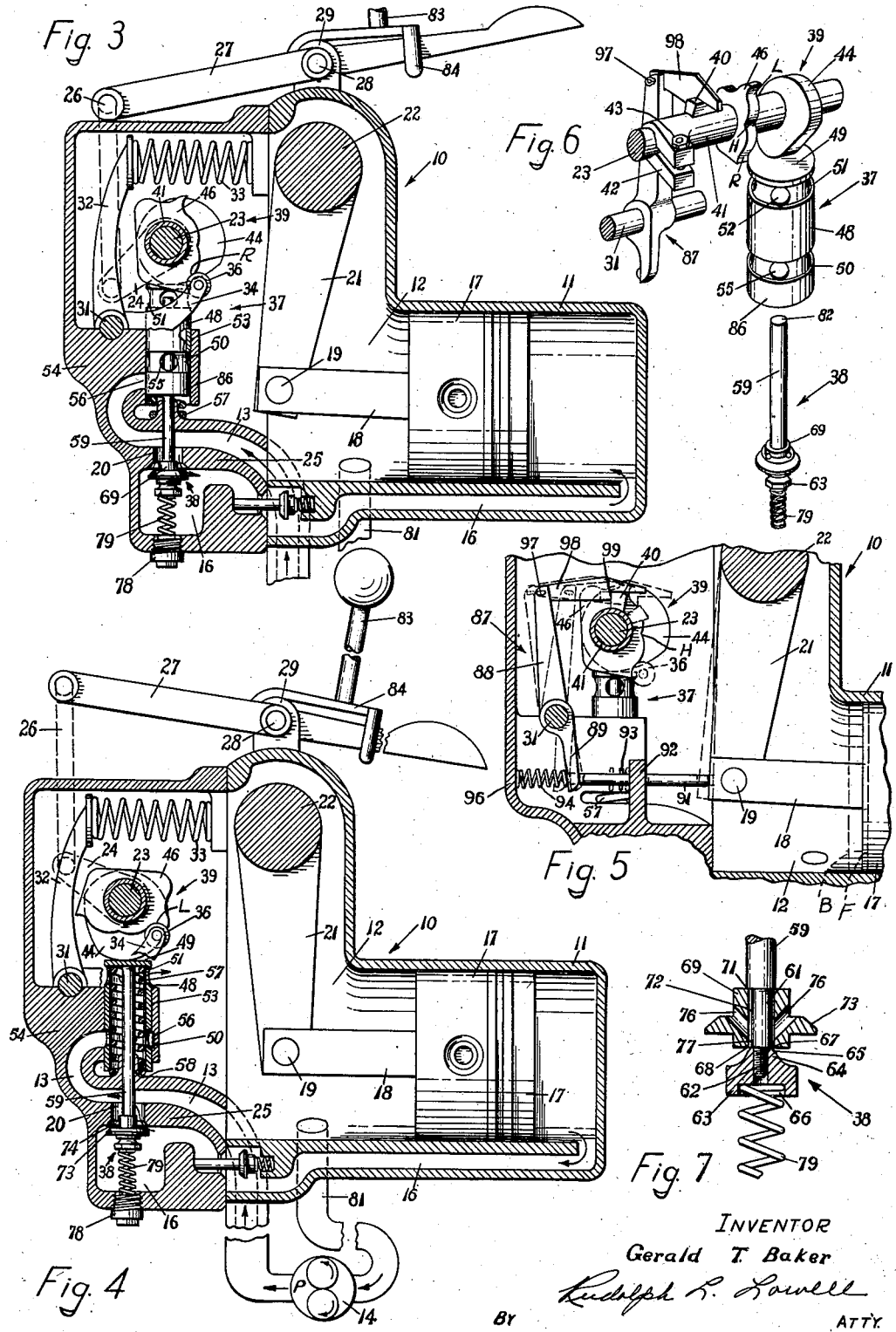

Patented Jan. 18, 1949

2,459,613

UNITED STATES PATENT OFFICE 2,459,613

VALVE MECHANISM FOR A HYDRAULIC POWER UNIT

Gerald T. Baker, Neligh, Nebr.

Application February 26, 1947, Serial No. 731,135

3 Claims. (Cl. 277—53)

This invention relates generally to hydraulic power units and in particular to a valve mechanism for a tractor-operated hydraulic power unit adapted to provide for the direct adjustment of a farm implement connected with the power unit or for the direct control of farm implements equipped with separate hydraulic-operated or power cylinders.

A hydraulic power unit now in common use is the John Deere power lift, with which many John Deere tractors are equipped. This lift, particularly the models for the years 1937 through 1946, includes a pair of cranks or lift arms extended rearwardly from a tractor and operated by a power cylinder, the supply of fluid to which is controlled through a foot actuated valve mechanism. The lift is generally satisfactory in operation, but some inconvenience in its operation is encountered due to the fact that the valve mechanism, on being actuated, provides for the movement of the piston in the power cylinder to one or the other of the ends of the power cylinder. As a result, the crank or lift arms, operated from the piston, are moved either to a full up or a full down position. In other words, the John Deere power lift operates to move and then hold the lift arms at some adjusted position therefor. However, the lift is incapable of moving the lift arms in a direction opposite to their direction of movement into such adjusted position so that the lift arms must be moved through a full cycle of movements in order to be returned to an initial adjusted position.

This limitation in the operation of the John Deere lift is particularly objectionable in the lifting and lowering of planter mechanisms, for example, relative to an adjusted planting position therefor, at the ends of rows or to accommodate ground irregularities in a row. Thus the time required to first move the lift arms from an adjusted position to a raised position and then through a complete cycle of movements back to their initial adjusted position necessitates that the tractor ordinarily be stopped to avoid a gap or break in the continuity of the planting operation.

Further, when the John Deere power lift is connected to supply fluid under pressure to a power cylinder carried on a farm implement, concurrently or separately from the supply of fluid to the power cylinder in the lift, the same inconvenience is encountered. Thus, for example, in the operation of a hydraulic tractor-mounted loading attachment, a complete and direct control of the raising and lowering of the loader lifting arms cannot be attained, since the lifting arms must be moved in a continuous direction until they are in one of their extreme positions of operation, before their movement can be reversed.

It is an object of this invention, therefore, to provide an improved tractor-operated hydraulic power unit.

Another object of this invention is to provide an improved valve mechanism for a tractor-operated hydraulic power unit.

A further object of this invention is to provide a valve mechanism for a hydraulic power lift which is capable of controlling the supply of fluid to, or its release from, a power cylinder at any moved position of the piston for such cylinder.

Another object of this invention is to provide a valve mechanism for a tractor-operated hydraulic power lift, which is adapted to control the operation of a power cylinder to accomplish a complete overall maneuverability of a lift member, operatively associated with a cylinder, with a minimum of effort and attention.

A still further object of this invention is to provide a valve mechanism for a tractor-operated hydraulic power unit for a tractor, which is adapted to immediately provide for the direct adjustment of a lift member to any moved position therefor, so as to eliminate the lift member being moved through a predetermined cycle of movements to an adjusted position.

Yet another object of this invention is to provide a valve mechanism for controlling the supply of fluid to the power cylinder of a hydraulic unit, which is of a compact and economical construction, capable of providing for the direct movement of the piston for the power cylinder from one position to any other moved position therefor, and adapted to be either foot or hand actuated.

Further objects, features and advantages of this invention will appear from the following description when taken in connection with the accompanying drawings, in which:

Fig. 1 is a longitudinal sectional view of a John Deere power lift with a pump unit illustrated diagrammatically and showing the valve mechanism of this invention in assembly relation therewith, and in a hold position therefor, with the view being taken substantially along the line 1—1 in Fig. 2, and having a limiting device in the valve mechanism removed for the purpose of clarity;

Fig. 2 is a transverse view taken substantially along the line 2—2 in Fig. 1;

Fig. 3, which is illustrated similarly to Fig. 2, shows the valve mechanism in its position for raising a lift member;

Fig. 4 is illustrated similarly to Fig. 2, except for certain parts being in section, and shows the valve mechanism in position for lowering a lift member;

Fig. 5 is a fragmentary sectional detail view of the valve mechanism showing a limiting device therefor;

Fig. 6 is a perspective partially exploded view of the valve mechanism;

Fig. 7 is a fragmentary sectional detail view of a valve member forming part of the valve mechanism; and Fig. 8 is a fragmentary sectional detail view showing the application of the power unit for operating a separate or independent hydraulic cylinder.

With reference to the drawings, the valve mechanism of this invention is illustrated in Figs. 1 and 2, in assembly relation with a John Deere hydraulic power lift, which includes a housing, designated generally as 10, integrally formed with a motor or power cylinder 11, an oil reservoir 12, a bypass or high pressure oil passage 13 connected between the reservoir 12 and a pump unit 14, and a motor oil passage 16, of an irregular shape, connected with the power cylinder 11 and with the passage 13 through a fluid opening or motor port 20 formed in a partition wall 25 constructed as part of the housing 10. The terminal end of the high pressure fluid passage 13 is defined by a fluid discharge port 56. A piston 17, for the cylinder 11, has a connecting rod 18, which is pivoted at 19 with a crank arm 21 for a crank shaft 22, which carries a pair of lift arms (not shown) arranged to the outside and on opposite sides of the housing 10. When the power lift is mounted on a tractor the lift arms are extended rearwardly from the tractor rear axle for pivotal up and down movement. For the purpose of convenience in description, the cylinder end of the housing will be referred to as its front end.

Assembled within the housing 10 is a cam shaft 23, having a rock arm 24 located outside of the housing 10, and connected through a pivoted link 26 with a foot pedal 27 mounted on a foot-actuated shaft 28, which is rotatably supported in bearings 29 arranged in a spaced relation on the top of the housing 10. In a usual assembly the foot pedal is arranged below the tractor operator's seat. A shaft 31, rotatably supported in the housing 10 in a spaced parallel relation with the cam shaft 23, but below and rearwardly of the shaft 23, carries an arm 32, the free or upper end of which is acted upon by a compression spring 33, to continuously bias the shaft 31 in a counter-clockwise direction, as viewed in Fig. 1. A second arm 34 mounted on the shaft 31, carries a cam roller 36 for a purpose which will appear later.

The structure thus far described forms no part of the present invention and is part of a commercially available type of a John Deere power lift.

The valve mechanism of this invention (Fig. 6) includes a bypass valve 37, a check valve 38, and a cam unit 39. The cam unit 39 is an integral casting formed with a hub or sleeve member 41 adapted to be mounted on the cam shaft 23. A split portion 42 at one end of the hub 41 carries a clamping bolt 43 for securing the hub 41 on the shaft 23. Spaced axially on the hub 41, and in order from the split portion 42, are a lug 40, a selector cam 46, and an actuating cam 44. The selector cam 46 is formed with indentations or cam pockets L, H and R, with the pocket H being arranged intermediate the pockets L and R.

The bypass valve 37 comprises a valve member 48 of a cylindrical tubular form, having a closed upper end 49. Annular grooves 50 and 51, arranged adjacent to bottom and top ends, respectively, of the valve member 48, are provided with a series of holes or openings 55 and 52, respectively, which are open to the interior of the valve member 48.

The valve member 48 (Fig. 1) is slidably supported in a bore 53 formed in a portion 54 of the housing 10, which portion also includes a part of the passage 13, and is arranged for up and down movement transversely across the outlet end or discharge port 56 of the passage 13 at a position such that its longitudinal axis lies in a plane common to the axis for the cam shaft 23.

The cam 44 is arranged relative to the valve member 48 so that its outer peripheral surface is adapted for bearing engagement with the closed end 49 of the valve member. This bearing engagement is yieldably maintained by the provision of a coil spring 57 positioned within the valve member 48 and arranged in compression between its closed end 49 and an upright bearing portion 58 formed as part of the housing 10.

The check valve 38 (Figs. 4, 6 and 7) includes a valve stem 59 formed with a reduced section 61 at its lower end, as viewed in Fig. 7. A threaded extension 62 projects axially downwardly from the reduced section 61 for connection with a cap nut or valve member 63, which has one end 64 threadable on the shank 62 and an annular cavity 66 formed in its opposite end in coaxial alignment with the threaded extension 62. The end 64, of the cap or valve member 63, is of a greater diameter than the reduced section 61 of the valve stem 59, and is adapted for abutting engagement with the shoulder 67 which defines the junction of the extension 62 with the section 61.

A valve seat 65 (Fig. 7) on the inner or top end 64 of the cap 63 is adapted for seating engagement with a mating valve seat 68 formed at the lower end of a valve member 69, which is axially movable on the reduced section 61 between the valve seat 65 and the shoulder 71 which defines the upper end of the reduced section 61. The center bore 72 of the valve member 69 is of a greater diameter than the reduced section 61 so that a space or clearance 77 is provided therebetween.

A second valve seat 73, on the valve member 69, is adapted for seating engagement with a valve seat 74 (Fig. 4) formed in the partition wall 25 and about the lower end of the motor port or opening 20, which is in coaxial alignment with the bore 53 for the valve member 48. The opposite sides of the valve seat 73 are fluid connected by downwardly and inwardly inclined passages 76 (Fig. 7), formed in the valve member 69 with their inner ends open to the space 77 between the bore 72 and the reduced section 61.

The valve stem 59 (Fig. 4) extends upwardly through the opening 20, which constitutes the junction of the passages 13 and 16, and through an opening in the bearing 58, so as to project within the coil spring 57 for the valve member 48 to a position adjacent to the closed end 49 of the valve member 48. This assembly is accomplished on removal of the drain plug 78 carried in the housing 10 at the bottom of the oil passage 16. The seat 73 on the valve member 69 is yieldably maintained or urged into a closing relation with the valve seat 74 by a compression spring 79 having its upper end seated in the cavity 66 of the cap member 63, and its lower end in abutting engagement with the plug 78.

It is seen, therefore, that the check valve 38, bypass valve 37 and cam 44 are arranged in superposed positions such that the longitudinal axes of the valve stem 59 and valve member 48 are in coaxial alignment and in a plane common to that of the actuating cam 44.

The selector cam 46 is arranged on the sleeve member 41 at a position to provide for the reception of the roller 36 within one of the pockets L, H and R. By virtue of the action of the spring 33 on the shaft 31, the roller 36 is yieldably maintained in bearing engagement with the selector cam 46.

In the operation of the valve mechanism, assume the piston 17 and the valve mechanism to be in their relative positions, illustrated in Fig. 1, representing a moved position of the piston providing for an adjusted position of the lift arms associated with the crank shaft 22, and a position for the valve mechanism which will hereinafter be referred to as its hold position. In this hold position the valve seats 73 and 74, and the valve seats 65 and 68 are in their closed positions so that no flow of oil takes place between the passages 13 and 16. As a result any oil in the passage 16 and the cylinder 11 is trapped therein and the piston 17 is held by such trapped fluid against forward movement toward its top center position. The check valve 38 is thus closed when the valve mechanism is in a hold position.

With the check valve 38 closed, the lower peripheral groove 50, in the valve member 48, partially extends within the outlet end 56 of the passage 13 whereby oil from the passage 13 is permitted to flow through the openings 55 into the valve member 48, and outwardly from the valve member and into the oil reservoir 12 through the openings 52 in the top peripheral groove 51 which is positioned at all times above the housing portion 54. It is thus seen that the bore or space within the by-pass valve member 48 constitutes a fluid passage with the openings 55 defining its inlet, and the openings 52 and open lower end of the member 48, the outlets therefor. Oil discharge from the pump 14 into the passage 13 thus bypasses the passage 16 for flow through the open bypass valve 37 into the reservoir 12, and from the reservoir 12 through a passage 81 to the inlet of the pump 14. This complementary action of the check valve 38 and bypass valve 37 is maintained by the cam 44, which on being actuated to the hold position for the valve mechanism, provides for an upward movement of the valve member 48 such that its closed end 49 is out of engagement with the upper end 82 of the valve stem 59 (Fig. 1).

The rotation of the actuating cam 44 to provide for a hold position of the valve mechanism is accomplished by rotation of the selector cam 46, in response to the movement of the foot pedal 27 to a position determined by the reception of the cam roller 36 within the cam pocket H, or neutral position on the selector cam 46. The reception of the roller 36 in one of the cam pockets L, H and R is evidenced by the feel on the foot pedal.

In order to raise the lifting members, associated with the crank shaft 22, fluid under pressure is supplied to the cylinder 11 to move the piston 17 rearwardly from its position shown in Fig. 1 to its position shown in Fig. 3, whereby the crank shaft 22 is rotated in a clockwise direction, as viewed in Fig. 3. This is accomplished by tilting the foot pedal 27 in a rearward direction, from its position shown in Fig. 1 to its position shown in Fig. 3, so as to depress the link 26. To facilitate this movement of the foot pedal 27, there is provided a hand operated lever 83 which is secured, by means including a bracket 84, to the foot pedal 27 at a position forwardly of its pivotal support in the bearings 29.

The rearward tilting movement of the foot pedal 27 through the link connection 26, rotates the cam shaft 23 in a counter-clockwise direction, as viewed in Figs. 1 and 3, whereby the cams 44 and 46 are also rotated in a counter-clockwise direction, to a preselected position determined by the movement of the cam pocket R to a position for receiving the cam roller 36. The reception of the roller 36 within the cam pocket R defines the raise position of the valve mechanism.

The actuating cam 44, on rotation from a hold position to its raise position, releases the valve member 48 for upward movement by the spring 57 to a position such that the peripheral groove 50 is moved out of fluid communication with the passage 13, to provide for the passage being closed at its outlet end 56 by the lower end portion 86 of the valve member 48.

As a result, an oil pressure is built up in the passage 13 which is capable of opening the valve member 69 against the pressure of the spring 79, so that oil from the passage 13 flows through the opening 20 and into the passage 16 to the cylinder 11. Fluid under pressure will thus be supplied to the cylinder 11 until the foot pedal 27 is tilted forwardly to its hold position shown in Fig. 1.

To accomplish an automatic movement of the cam unit 39 to its hold position, concurrently with the movement of the piston 17 to its rearmost or bottom center position therefor, which defines a maximum lifting action of the power unit, there is provided a limit device, indicated generally at 87 in Figs. 2, 5 and 6.

The limit device includes a bell crank which is mounted on the shaft 31 with an upper arm 88 extended upwardly to a position above the shaft 23, and a lower arm 89 projected downwardly to a position at substantially the level of the longitudinal axis of the cylinder 11.

The free end of the lower arm 89 is in bearing engagement with the rear end of a pin 91 extended longitudinally of the cylinder 11 and slidably supported in an upright projection 92 formed in the housing 10. The forward movement of the slidable pin 91 toward the cylinder 11 is limited by the engagement of a cotter key 93, extended therethrough, with the rear side of the projection 92. The arm 89 is yieldably maintained in bearing engagement with the rear end of the pin 91 by a coil spring 94 arranged in compression between the arm 89 and the rear wall 96 of the housing 10.

Pivotally connected at 97 with the free end of the upper arm 88 is a pawl member 98 which extends in a forward direction across the top of the cam unit sleeve 41 at a position between the selector cam 46 and the split end portion 42. The pawl 98 is formed at its free or forward end with a cutaway portion to provide a shoulder 99 for engaging the lug 40, which is formed on the hub 41 at a position spaced substantially 90° from the neutral position H on the selector cam 46. When the piston 17 is in a forward position, illustrated in dotted lines at F, in Fig. 5, the forward end of the pin 91 is out of engagement with the crank 21 and held in a stop position by the cotter key 93. Also the shoulder 99 on the pawl 98 is located rearwardly of the lug 40.

As the piston 17 approaches its rear or bottom center position, the crank arm 21 engages the forward end of the slidable pin 91, as illustrated in full lines in Fig. 5. On a continued rearward movement of the piston 17, to its dotted line position, illustrated at B in Fig. 5, the pin 91 is moved rearwardly against the action of the spring 94, whereby the arms 88 and 89 are pivoted in a clockwise direction, as viewed in Fig. 5. This movement of the arms 88 and 89 in turn moves the pawl 98 in a forward direction to engage the shoulder 99 with the lug 40, so as the piston moves to its rear position, shown in dotted lines at B in Fig. 5. The cam unit 39 is then rotated in a clockwise direction to a position providing for the roller 36 being received in the neutral portion H of the selector cam 46. At this position of the cam unit 39, the bypass valve 37 and check valve 38 are actuated to their hold positions indicated at Fig. 1. It is to be noted for a purpose which will appear later, that the shoulder 99 is moved forwardly out of engagement with the lug 40 so that the bottom side of the pawl 98 rests on the lug 40.

To release the fluid pressure applied on the piston 17, to permit a rotation of the crank shaft 22 in a counter-clockwise direction, to in turn provide for a lowering of the lift members associated therewith, the foot pedal 27 is tilted forwardly from its position shown in Fig. 1 to its position shown in Fig. 4. This movement of the foot pedal 27, through the link 26 and rocker arm 24, rotates the cam unit 39 in a clockwise direction from its position shown in Fig. 1, to its position shown in Fig. 4, to provide for the reception of the cam roller 36 in the pocket L of the selector cam 46, which defines the release or lowering position of the valve mechanism.

During the rotation of the cam unit 39 from a hold position to a release position, the actuating cam 44 moves the valve member 48 of the bypass valve 37, in a downward direction, to a position at which the peripheral groove 50 is open to the fluid passage 13, whereby fluid from the passage 13 is permitted to flow into the reservoir 12. Concurrently with this actuation of the bypass valve 37, the closed end 49 of the valve member 48 engages and moves the valve stem 59 downwardly against the action of the spring 79, so as to open the check valve 38. Fluid from the cylinder 11 is thus permitted to flow into the passage 16, and outwardly therefrom into the passage 13 for return to the reservoir 12.

It is seen, therefore, that the valve mechanism is directly responsive in operation to an actuation of the foot pedal 27 to provide for a movement of the piston 17 in either direction, from a moved position therefor, and to hold the piston 17 against movement at any moved position.

If it is desired to slowly lower the lifting members associated with the crank shaft 22, the foot pedal 27, from its position shown in Fig. 1, is only tipped slightly forward through a distance sufficient to provide for a downward movement of the valve stem 59 by the closed end 49 of the valve member 48, to provide for the engagement of the shoulder 71 with the upper end of the valve member 69 (Fig. 7).

At this moved position of the valve stem 59 relative to the valve member 69, the valve seat 65 on the cap member 63 is out of engagement with the valve seat 68 on the valve member 69, whereby fluid is permitted to flow from the passage 16, into the space 77 and outwardly therefrom through the passages 76 into the oil passage 13. The check valve 38, by virtue of this action, is thus only cracked to permit a slow flow of the fluid from the passage 16 into the passage 13 for travel into the reservoir 12.

To increase the flow of oil from the cylinder 11 into the passage 13, the foot pedal 27 may be progressively moved toward its position shown in Fig. 4, until a maximum opening of the check valve 38 is obtained.

In those instances where a separate hydraulic cylinder, associated with a farm implement, is to be operated independently of the lift members associated with the crank shaft 22, the plug 78 is removed and an L-connection 105 or the like (Fig. 8), may be substituted therefor. A cylinder 102 which, for example, may form part of a tractor loader attachment, is then suitably connected with the connection 105. The spring 79 of the check valve 38 then bears directly against the inner end of the connection 105, as shown in Fig. 8.

In supplying fluid under pressure to the cylinder 102 the foot pedal 27 is moved from its hold position in Fig. 1 to its raise position in Fig. 3 whereby to provide for an operation of the valve mechanism in all respects similar to its operation hereinabove described. By virtue of the fact that the crank shaft 22 will be without any load, the piston 17 is moved to its bottom center or rearmost position to actuate the limit device 87. This movement of the piston 17 and operation of the limit device 87 will take place prior to any movement of the piston 103 for the cylinder 102. However, as illustrated in dotted lines in Fig. 5, the shoulder 99 on the pawl 98, at a rearmost position for the piston 17, is out of engagement with the lug 40. In other words, the shoulder 99 is moved forwardly out of engagement with the lug 40, after the selector cam 46 has been moved to a position to locate the roller 36 within the cam pocket H.

As a result, when the foot pedal 27 has been returned by the action of the limit device 87, from its raise position in Fig. 3 to its hold position in Fig. 1, it is only necessary to again move the pedal 27 to its raise position. Since the piston 17 is in its rearmost position, this second movement of the pedal 27 to its raise position in Fig. 3, takes place because the lug 40 in the cam unit 39 is capable of slidably engaging the under side of the pawl 98 to merely pivot the pawl in an upward direction.

The pawl 98, after the piston 17 has been moved to its rearmost position, is thus rendered inoperative so that on later actuation of the pedal 27 the valve mechanism is operated in all respects similar to its operation relative to the control of the crank shaft 22, to control the operation of the piston 103 of the cylinder 102. Stated otherwise, after the piston 17 has been moved to its rearmost position, the cylinder 11 and a portion of the passage 16 merely constitute an oil reservoir and the valve mechanism controls the flow of oil through the passage 13, a part of the passage 16, and through the check valve 38, connection 105 and cylinder 102.

Further, due to the operation of the limit device 87 being rendered ineffective by the initial actuation of the pedal 27 to a raise position, the raising and lowering of the piston 103, and its retention in a moved position, takes place entirely in response to the operation of the foot pedal 27. It is apparent also that a double operation of the pedal 27 to a raise position is necessary for only the initial lifting of the piston 103, and that any later raising of the piston 103 will take place in direct response to a movement of the pedal 27 to its raise position.

From a consideration of the above description, it is seen that the valve mechanism of this invention is readily applicable to a commercially available power lift, to provide for a complete and direct adjustment of lift members associated with the power unit, to any desired adjusted position without requiring the movement of the lift members through a predetermined cycle of movement. Further, the valve mechanism operates efficiently to accomplish a direct movement of a lift piston, associated with a lift cylinder separate from the power unit but in fluid connection therewith, so that the unit is capable of use with hydraulically-operated farm implements which are attachable to the tractor.

Although the invention has been described with respect to a preferred embodiment thereof, it is to be understood that it is not to be so limited since changes can be made therein which are within the full intended scope of this invention, as defined by the appended claims.

I claim:

1. A valve mechanism for a hydraulic power unit including a casing formed with a high pressure fluid passage having a fluid discharge port at its terminal end and a fluid port intermediate its ends, said mechanism including a by-pass valve member co-axial with said intermediate port and reciprocally movable relative to said discharge port to control the flow of high pressure fluid through said discharge port, said by-pass valve being formed with a fluid passage therein having a fluid outlet opening and a fluid inlet opening which is movable into and out of registration with said fluid discharge port, a check valve for controlling the flow of fluid through said intermediate port, means for yieldably holding said check valve in a closed position therefor, and means for operating said check valve and by-pass valve in a complementary relation such that said check valve is opened by said operating means, when said by-pass valve is moved to a first position in which said fluid inlet opening is in registration with said fluid discharge port, and by the pressure of the fluid in said high pressure fluid passage when said by-pass valve is moved to a second position in which said fluid inlet opening is out of registration with said fluid discharge port, with said check valve being closed by said yieldable means on movement of said by-pass valve to a third position, intermediate said first and second positions therefor, in which third position said fluid inlet opening is in partial registration with said discharge port.

2. A valve mechanism for a hydraulic power unit including a casing formed with a high pressure fluid passage having a fluid discharge port at its terminal end and a fluid port intermediate its ends, said mechanism including a reciprocating by-pass valve for controlling the flow of fluid through said discharge port arranged in a coaxial relation with said intermediate port, a check valve for controlling the flow of fluid through said motor port having a stem member engageable by said by-pass valve, a first valve member mounted in a spaced relation about said stem member for movement axially thereof, a seat portion on said first valve member adapted for seating engagement with a seat portion formed about said intermediate port, said first valve member having fluid passages formed therein within the confines of said seat portion thereon to fluid connect said intermediate port with the space between said stem member and said first valve member, a stop portion on said stem member for limiting the movement of said first valve member toward said by-pass valve, a second valve member on said stem member formed with a seat portion engageable with said first valve member to close one end of the space formed between said stem and first valve member, said second valve member constituting a stop for limiting the movement of said first valve member away from said by-pass valve, yieldable means acting on said second valve member to maintain said two valve members in a seated relation, and said first valve member seated relative to said intermediate port, and means for reciprocating said by-pass valve to relatively control the flow of fluid through said discharge and intermediate ports, said by-pass valve on movement thereof to engage and move said valve stem, providing for the opening of said second valve member prior to any opening movement of said first valve member.

3. A valve mechanism for a hydraulic power unit including a casing formed with a high pressure fluid passage having a fluid discharge port at its terminal end and a fluid port intermediate its ends, said mechanism including a reciprocally movable by-pass valve for controlling the flow of fluid through said discharge port, a check valve for controlling the flow of fluid through said intermediate port arranged in coaxial alignment with said by-pass valve, said check valve including a pair of cooperating valve members relatively arranged and constructed to close said intermediate port, with one of said valve members adapted to be opened relative to the second one of said valve members to partially open said intermediate port, means acting on said one valve member to yieldably maintain said two valve members in closed positions, and means on said check valve engageable with said by-pass valve, on movement of said by-pass valve in one direction to open said discharge port, such that said one valve member is opened prior to any opening movement of said second valve member.

GERALD T. BAKER.

REFERENCES CITED

The following references are of record in the file of this patent:

UNITED STATES PATENTS

| Number | Name | Date |
|---|---|---|
| 1,842,790 | Lindgren et al. | Jan. 26, 1932 |
| 2,107,760 | McCormick et al. | Feb. 8, 1938 |
| 2,340,474 | Johnson | Feb. 1, 1944 |
| 2,403,422 | Worthington | July 2, 1946 |